(12) United States Patent
Bardeen et al.

(10) Patent No.: US 6,497,046 B1
(45) Date of Patent: Dec. 24, 2002

(54) SAFETY SAW FOR CUTTING SOFT MATERIALS

(75) Inventors: Kea L. Bardeen, Lakewood, CO (US); John P. Bardeen, Denver, CO (US); Barry P. Brown, Denver, CO (US)

(73) Assignee: Pumpkin Ltd., Denver, CO (US)

( * ) Notice: Subject to any disclaimer, the term of this patent is extended or adjusted under 35 U.S.C. 154(b) by 0 days.

(21) Appl. No.: 09/156,986

(22) Filed: Sep. 18, 1998

(51) Int. Cl.[7] .......................... B23D 51/01; B27B 21/00
(52) U.S. Cl. ............................. 30/517; 30/342
(58) Field of Search .................. 30/144, 517, 525, 30/335, 324, 322, 342; 83/836–846, 853; D7/97, 107

(56) References Cited

U.S. PATENT DOCUMENTS

| | | | | |
|---|---|---|---|---|
| 21,520 A | * | 9/1858 | Smith ........................... | 30/144 |
| 45,009 A | * | 11/1864 | Alexander ................... | 30/144 |
| 85,417 A | * | 12/1868 | Andrews ...................... | 83/846 |
| 170,934 A | * | 12/1875 | Broadbooks ................. | 30/144 |
| 180,711 A | | 8/1876 | Gottschalk | |
| 403,031 A | * | 5/1889 | Beckwith ..................... | 30/144 |
| 602,158 A | * | 4/1898 | Green .......................... | 30/517 |
| 1,021,444 A | * | 3/1912 | Bates .......................... | 30/144 |
| 1,282,404 A | * | 10/1918 | Fife ............................. | 30/144 |
| D76,293 S | * | 9/1928 | Evans .......................... | 30/324 |
| D140,397 S | * | 2/1945 | Waterman .................... | 30/144 |
| 2,382,304 A | | 8/1945 | Foltz et al. | |
| 2,646,094 A | * | 7/1953 | Russell ........................ | 83/846 |
| 2,751,683 A | * | 6/1956 | Johns .......................... | 30/324 |
| 2,827,086 A | * | 3/1958 | Minor .......................... | 30/517 |
| 2,890,728 A | * | 6/1959 | Craven ........................ | 83/846 |
| 2,966,931 A | | 1/1961 | Dreier | |
| 3,005,478 A | * | 10/1961 | Laviano ....................... | 30/144 |
| 3,033,251 A | * | 5/1962 | Atkinson et al. ............. | 30/355 |
| 3,205,575 A | * | 9/1965 | Senkewitz .................... | 30/355 |
| 3,259,132 A | * | 7/1966 | Katter .......................... | 30/324 |
| 3,480,055 A | | 11/1969 | La Pointe | |
| 3,596,300 A | * | 8/1971 | D'amico ...................... | 30/144 |
| 3,756,298 A | | 9/1973 | West | |
| D256,546 S | * | 8/1980 | Holland-Letz ............... | D7/107 |
| 4,827,619 A | | 5/1989 | Alm | |
| 4,828,114 A | | 5/1989 | Bardeen | |
| 4,841,638 A | | 6/1989 | Bardeen et al. | |
| 5,687,484 A | * | 11/1997 | Hanhn .......................... | 30/355 |
| D387,264 S | * | 12/1997 | Snow ........................... | D7/107 |
| 5,832,615 A | | 11/1998 | Costen et al. | |
| D402,176 S | * | 12/1998 | Lauster et al. ............... | D7/107 |
| D408,252 S | * | 4/1999 | Holland-Letz ............... | D7/107 |

FOREIGN PATENT DOCUMENTS

GB 909709 10/1962

* cited by examiner

Primary Examiner—Hwei-Siu Payer
(74) Attorney, Agent, or Firm—Timothy J. Martin; Michael R. Henson; Rebecca A. Gegick

(57) ABSTRACT

A safety saw may be used by a child and includes a handle and a forwardly extending blade. The handle has a first portion, a second portion and a waisted portion between the first and second portions. The minimum diameter of the waisted portion is no more than fifty percent (50%) of the maximum diameter of the second end portion. Preferably, the first and second portions have equal radii. The blade has teeth only on one lateral edge, and a distal tip extends forwardly along the longitudinal axis of the blade to a rounded end. The distal tip has a length at least twice the width of a tooth, and it is devoid of any teeth. The leading edge of each tooth is perpendicular to the longitudinal axis while the trailing edge is oblique to the longitudinal axis at an angle of about 50° to 60°. The height and width of the teeth may be the same; alternatively, the width may be twice the height.

19 Claims, 1 Drawing Sheet

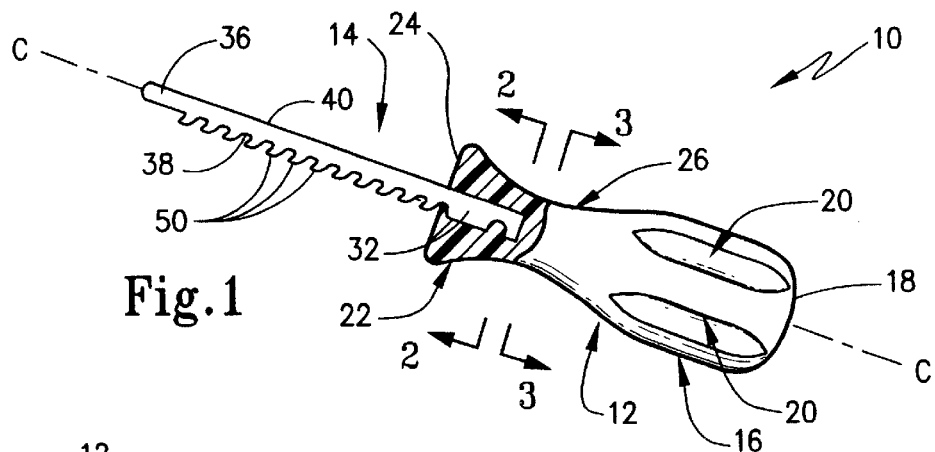
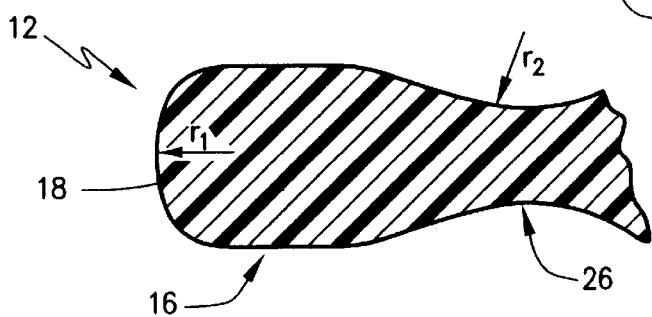
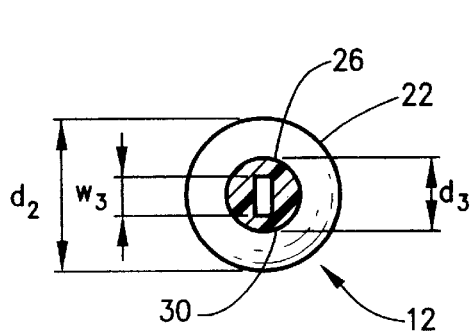
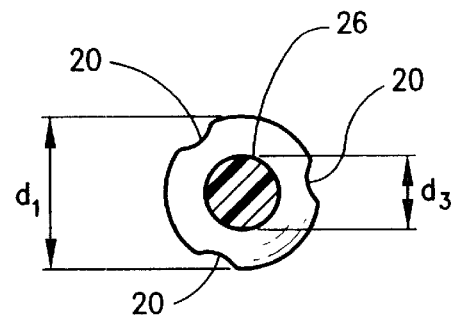
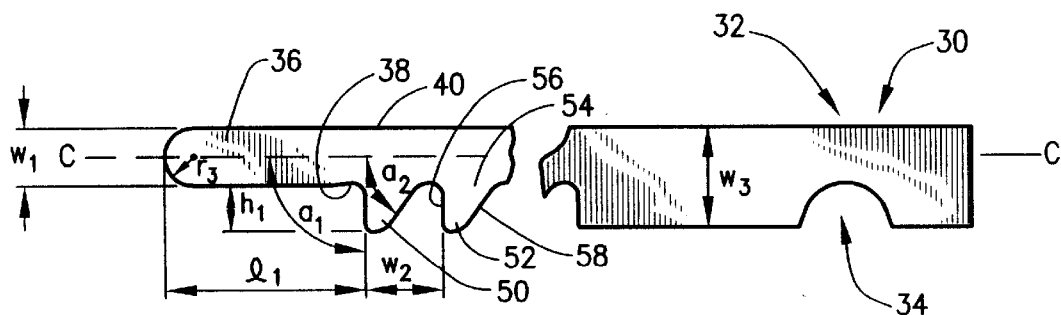

SAFETY SAW FOR CUTTING SOFT MATERIALS

FIELD OF THE INVENTION

The present invention is broadly directed to hand-held sawing devices. More particularly, however, the present invention is directed to a child's safety saw which may be used to cut features into a relatively soft material. Specifically, the present invention is directed to a saw that may be used by a child to carve a pumpkin, watermelon or other vegetable as an artistic object.

BACKGROUND OF THE INVENTION

A wide variety of cutting tools have been known since the dawn of time. While many cutting tools used today are mechanically driven, there is still a wide variety of manually employed cutting implements which may be used to perform a specific function. For example, knives, awls, saws, scissors, chisels and the like are all examples of cutting tools found in every day use which are of the type that are manually implemented. Not only is there a plethora of distinct types of cutting tools, but many varieties exist within each type such that a specialized function may be performed by the respective tool.

A variety of specialized cutting tools have been developed by or for the assignee of the present invention. These tools are ones particularly adapted for cutting or carving features into relatively soft materials such as pumpkins, squashes, melons, etc. Here, a decorative design is placed in the fleshy shell of a pumpkin, for example, and the design features are then carved in the shell of the pumpkin primarily by a small, hand-held saw and by drilling tools.

As may readily be appreciated, the activity of pumpkin carving or the creation of designs in other vegetable materials provides a wholesome family function. Moreover, this activity particularly attracts young children. In the past, however, pumpkin carving was typically accomplished with the use of pocket knives, paring knives and the like. Due to the size of these cutting instruments, a typical carver was only able to obtain limited, fairly large scale decorative features. In addition, such knives were quite difficult to control and this, in conjunction with the sharpness of the knife, exposed the carver to the danger of injury. The result was that pumpkin carving had a fairly high degree of danger for young children.

In an effort to meet the needs for safer instruments that might be utilized to carve decorative designs in pumpkin shells, a pumpkin carving kit was developed and is disclosed in U.S. Pat. No. 4,828,114 issued May 9, 1989 to John P. Bardeen. This pumpkin carving kit allows more intricate designs to be carved in the pumpkin shell and increases the safety over normal pre-existing carving techniques for children, adults and other enthusiasts.

While the pumpkin carving kit and the implements disclosed in the above noted patent were a substantial improvement over pocket knives, paring knives and the like, the sharp edges of the serrated saw blade still require care when manipulating the hand-held saw during the cutting operation. Such attention and care is naturally difficult for extremely young children.

Accordingly, a continued need exists to create carving tools which can be employed even by very young children when carving pumpkins, watermelons or other vegetables. There is a need for such a device that can be relatively easily manipulated by a child while minimizing exposure to any sharp cutting edges.

SUMMARY OF THE INVENTION

It is an object of the present invention to provide a new and useful hand-held saw especially adapted for use by relatively small children in carving soft materials such as pumpkin shells, other vegetable shells, and the like.

It is another object of the present invention to provide a hand-held saw which can cut the shell of a pumpkin, melon, squash or other vegetable while being constructed to avoid substantial risk of cutting the human skin.

Yet another object of the present invention is to provide a hand-held cutting tool which has a handle particularly constructed to be gripped by a small child, either by the fist or by the fingers of the child's hand.

Yet another object of the present invention is to provide a hand-held cutting tool which has cutting teeth which act to eject the fleshy shards cut from a vegetable shell during the cutting operation.

According to the present invention, then, a safety saw is adapted to be grasped by a child's hand for use in cutting soft materials. Broadly, the safety saw includes handle that includes a first end portion having a first end surface oriented transversely to a longitudinal axis of the handle and a second end portion which has a second end surface oriented transversely to the longitudinal axis. The first and second end portions have first and second diameters, respectively, and a central waisted portion is disposed between the first and second end portions with the waisted portion having a minimum diameter that is no more than fifty percent (50%) of the second diameter. A blade is secured at proximal blade end portion to the second end portion of the handle. This blade projects oppositely of the first end portion along the longitudinal axis to terminate in a distal blade tip. This blade is provided with a plurality of saw teeth.

Preferably, these saw teeth are disposed along a first lateral edge of the blade with the blade having a second lateral edge opposite to this first lateral edge. The saw teeth are only on the first lateral edge between the second end surface and the distal tip portion of the blade. Each of the saw teeth has a leading tooth edge that is opposite the handle and a trailing tooth edge opposite the leading tooth edge. The leading tooth edge is preferably oriented at an angle of about 90° with respect to the longitudinal axis while the trailing tooth edge is oriented obliquely with respect to the longitudinal axis, such as at an acute angle between a range of 50° to 60°.

The first surface of the first end portion of the handle is preferably formed at a radius of curvature of about 0.5 inch (1.27 centimeter). The first and second diameters, respectively, are the first and second end portions are preferably equal. The waisted portion is located closer to the second end surface of the handle than it is to the first end surface and this waisted portion is formed at a radius of curvature relative to the central longitudinal axis of about 1.5 inches (3.8 centimeter).

The saw teeth are preferably located along a first lateral edge with the blade having a second lateral edge opposite the first lateral edge. The blade has a blade width between these two lateral edges. The saw teeth preferably have a width that is about equal to the tooth height. The distal tip of the blade is devoid of saw teeth and extends for a length that is at least twice the tooth width. The blade also has a shank portion, preferably molded integrally with the handle, with the shank portion having a shank width that is equal to the sum of the tooth height and the blade width. The distal tip portion of the blade has a tip end formed of a radius of curvature of about 0.050 inches (0.125 centimeters).

These and other objects of the present invention will become more readily appreciated and understood from a consideration of the following detailed description of the exemplary embodiment when taken together with the accompanying drawings, in which:

BRIEF DESCRIPTION OF THE DRAWINGS

FIG. 1 is a perspective view, partially broken-away, of the safety saw according to the exemplary embodiment of the present invention;

FIG. 2 is a cross-sectional view taken about lines 2—2 of FIG. 1;

FIG. 3 is a cross-sectional view taken about lines 3—3 of FIG. 1;

FIG. 4 is a cross-section view of the first end portion of the handle used with the exemplary embodiment of the present invention; and FIG. 5 is a side view in elevation of the blade of the exemplary embodiment of the present invention.

DETAILED DESCRIPTION OF THE EXEMPLARY EMBODIMENTS

The present invention is directed to a safety saw that may be used to cut features into a relatively soft material. This safety saw is particularly constructed so as to be relatively safe for use by a young child for carving design features, for example, into a pumpkin shell in order to present that creative art for the Halloween season. As such, the invention is constructed to be easily gripped by either the fingers or the fist of a child while being used in a sawing motion. The teeth of this saw are constructed so as to reduce any likelihood that the child may inadvertently cut or injure himself/herself while at the same time being effective in cutting the shell of a vegetable.

With reference, first, to FIGS. 1–4, it may be seen that safety saw 10 has a handle 12 and a blade 14 secured thereto. Handle 12 is oriented along a central longitudinal axis "C" and includes a first end portion 16 having a first end surface 18 oriented transversely to the longitudinal axis "C". First end portion 16 has a first diameter "$d_1$" that is preferably 1.0 inch (2.54 cm). A plurality of scallops 20 longitudinally extend along first end portion 16, to form concavities in the outer side thereof. Scallops 20 are equangularly disposed around the outer surface of first end portion 16. Preferably, there are three such scallops 20 oriented 180° apart from one another. Handle 12 includes a second end portion 22 that has a second end surface 24 that is oriented transversely to the longitudinal axis "C". Second end portion 22 has a second diameter "$d_2$" that is preferably equal to first diameter "$d_1$".

Handle 12 also has a central waisted portion 26 disposed between first and second end portions 16 and 22 with waisted portion 26 having a diameter that is smaller than each of diameters "$d_1$" and "$d_2$". Preferably, central waisted portion 26 has a minimum diameter "$d_3$" that is no more than 50% of the diameter "$d_2$" of second end portion 22. Central waisted portion 26 is preferably located closer to the second end surface 24 then it is to the first end surface 18 so that first end portion 16 may be grasped by a small child's fist with the thumb extending over first end surface 18. To this end, first end surface 18 is preferably convex and is formed at radius of curvature "$r_1$" that is about 0.5 inch (1.27 cm). The minimum diameter "$d_3$" of central waisted portion 26 is preferably about 0.5 inch (1.27 cm). By having central waisted portion 26 of such reduced dimension along with the larger size of the diameter of second end portion 22, a child may also grip handle 12 so that his/her thumb presses against the curved, outwardly flaring surface of second portion 22 between central waisted portion 26 and second end portion 22 with his/her "little finger" oriented around first end portion 16. This sizing helps prevent the child's hand from inadvertently sliding off of handle 12 towards blade 14. Accordingly, waisted portion 26 is formed at a radius of curvature "$r_2$" relative to the central longitudinal axis of about 1.5 inch (3.8 cm).

With reference to FIGS. 1, 2, and 5, it may be seen that blade 14 has a shank portion 30 at a proximal end portion 32 thereof. Shank 30 is molded integrally with handle 12 which is constructed of any suitable material, such as an ejectably moldable plastic material. To this end, shank portion 30 includes a notch 34 that helps engage the plastic material during this integral molding process.

Blade 14 projects oppositely of the first end portion 16 of handle 12 along the longitudinal axis "C" to terminate in a distal blade tip 36. Blade 14 has a first lateral edge 38 and a second lateral edge 40 opposite edge 38 so as to have a blade width "$w_1$" as measured between the first and second lateral edges. A plurality of saw teeth 50 extend longitudinally along first lateral edge 38 and project laterally therefrom to define a tooth height "$h_1$" as measured between first lateral edge 38 and a vertex 52. Each saw tooth 50 has a base 54 oriented oppositely vertex 52. The blade width "$w_1$" should be at least equal in dimension to the tooth height, but preferably it is greater than the tooth height "$h_1$". A leading tooth edge 56 is preferably oriented at an angle "$a_1$" that is perpendicular to central longitudinal axis "C". Moreover, each saw tooth 50 has a trailing tooth edge 58 that is oriented obliquely to axis "C" at an acute angle "$a_2$" that is about 50° to 60° with respect to central longitudinal axis "C". Each tooth 50 moreover has a tooth width "$w_2$" as measured along the base, that is, along lateral edge 38.

Distal blade tip 36 extends longitudinally for a length "$l_1$" that is preferably at least twice the tooth width "$w_2$" and is formed at a tip radius "$r_3$" that is about 0.05 inches (0.125 cm). This allows a user to puncture the fleshy shell of the vegetable and have sufficient penetration to support insertion of the blade prior to the encountering of the fleshy shell with the cutting saw teeth 50. This further increases the safety of safety saw 10 during use. Moreover, it is preferred that the tooth width "$w_2$" should be about twice the tooth height "$h_1$". This, along with the angle of the trailing tooth edge 58 helps eject shreds of the cut material from the vegetable shell during the cutting operation.

As noted above, shank portion 30 is integrally molded with handle 12. Here, shank portion 30 has a shank width "$w_3$" that is preferably equal to the sum of the tooth height "$h_1$" and the blade width "$w_1$".

The following are the preferred dimensions for the various parameters noted above.

$w_1$=0.110 inch
$w_2$=0.156 inch
$w_3$=0.185 inch
$h_1$=0.075 inch
$l_1$=0.375 inch
$d_1$=0.960 inch (2.54 cm)
$d_2$=0.960 inch (2.54 cm)
$d_3$=0.480 inch (1.27 cm)

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

We claim:

1. A safety saw adapted to be grasped by a child's hand for use in cutting soft materials, comprising:

(a) a handle having a central longitudinal axis and including a first end portion which has a first end surface and an opposite second end portion which has a second end surface; and (b) a blade secured at a proximal blade end portion to the second end portion of said handle and projecting oppositely of the first end portion along the longitudinal axis in a forward direction to terminate in a distal blade tip, said blade including a plurality of saw teeth disposed along a first lateral edge thereof and having a second lateral edge opposite the first lateral edge, said distal tip formed as a linear extension of the blade along the longitudinal axis such that said blade has saw teeth only on the first lateral edge between the second end surface and said distal tip portion with said distal tip being devoid of saw teeth, each said saw tooth having a forwardly oriented leading tooth edge and a rearwardly trailing tooth edge opposite the leading tooth edge, each said leading tooth edge oriented at an angle of about 90° with respect to the longitudinal axis and said trailing tooth edge oriented obliquely with respect to the longitudinal axis, each said saw tooth having a tooth width and a tooth height, said distal tip portion having a tip length that is about twice the tooth width.

2. A safety saw according to claim 1 wherein the tooth height is about one-half the tooth width.

3. A safety saw according to claim 1 wherein said distal tip portion has a rounded tip end formed at a radius of curvature ($r_3$) of about 0.050 inch (0.125 cm).

4. A safety saw according to claim 1 wherein said blade has a blade width that is about twice the tooth height.

5. A safety saw adapted to be grasped by a child's hand for use in cutting soft materials, comprising:

(a) a handle having a central longitudinal axis and including a first end portion which has a first end surface oriented transversely to the longitudinal axis and an opposite second end portion which has a second end surface oriented transversely to the longitudinal axis said first end portion having a first maximum diameter and said second end portion having a second maximum diameter, and a central waisted portion disposed between said first and second end portions, said waisted portion having a minimum diameter that is no more than fifty percent (50%) of the second maximum diameter; and (b) a blade secured at a proximal blade end portion to the second end portion of said handle and projecting oppositely of the first end portion forwardly along the longitudinal axis to terminate in a distal blade tip, said blade provided with a plurality of saw teeth.

6. A safety saw according to claim 5 wherein said waisted portion is located closer to the second end surface than to the first end surface.

7. A safety saw according to claim 5 wherein the minimum diameter is about 0.5 inch (1.27 cm).

8. A safety saw according to claim 5 wherein said first surface is convex and formed at a radius of curvature ($r_1$) of about 0.5 inch (1.27 cm).

9. A safety saw according to claim 8 wherein said waisted portion is formed at a radius of curvature ($r_2$) relative to the central longitudinal axis of about 1.5 inch (3.8 cm).

10. A safety saw according to claim 5 wherein the first and second diameters are equal.

11. A safety saw according to claim 5 wherein said saw teeth are located along a first lateral edge of said blade, said blade having a second lateral edge opposite said first lateral edge, said blade having a blade width ($w_1$) as measured between the first and second lateral edges thereof.

12. A safety saw according to claim 11 wherein each said saw tooth has a base extending along the first lateral edge, a vertex opposite said base, a forwardly oriented leading tooth edge and a rearwardly oriented trailing tooth edge opposite said leading tooth edge, said base defining a tooth width ($w_2$), each said saw tooth having a tooth height ($h_1$) measured for the base to the vertex thereof.

13. A safety saw according to claim 12 wherein the tooth width is about equal to the tooth height.

14. A safety saw according to claim 12 wherein said leading edge is oriented at an angle ($a_1$) that is perpendicular to the central longitudinal axis.

15. A safety saw according to claim 14 wherein each said trailing tooth edge is oriented at an acute angle ($a_2$) of about 50° to 60° with respect to the central longitudinal axis.

16. A safety saw according to claim 12 wherein said distal tip is a linear extension of said blade along the longitudinal axis thereof and is devoid of said saw teeth and extends for a tip length ($l_1$) that is at least twice the tooth width.

17. A safety saw according to claim 12 wherein the blade width is greater than the tooth height.

18. A safety saw according to claim 5 wherein said blade has a shank portion that is molded integrally with said handle.

19. A safety saw according to claim 18 wherein said shank portion has a shank width ($W_3$) that is equal to a sum of the tooth height and the blade width.

* * * * *